United States Patent [19]

Cooper

[11] 4,298,510

[45] Nov. 3, 1981

[54] HARDENABLE RESIN COMPOSITIONS

[75] Inventor: John Cooper, West Kilbride, Scotland

[73] Assignee: Imperial Chemical Industries Limited, London, England

[21] Appl. No.: 770,431

[22] Filed: Feb. 22, 1977

Related U.S. Application Data

[63] Continuation of Ser. No. 565,701, Apr. 7, 1975, abandoned.

[30] Foreign Application Priority Data

Apr. 23, 1974 [GB] United Kingdom ............... 17673/74

[51] Int. Cl.$^3$ ............................................. C08L 67/00
[52] U.S. Cl. ....................... 260/29.2 E; 260/29.2 EP; 260/29.2 TN; 260/29.3; 260/29.4 R
[58] Field of Search ................. 260/865, 29.6 S, 40 R, 260/29.2, 29.2 TN, 29.2 EP, 29.2 N, 29.2 E, 29.3, 29.4 R, 38, 39, 37, 37 EP, 37 N

[56] References Cited

U.S. PATENT DOCUMENTS 2,568,331 6/1947 Frilette .............................. 260/40 R
3,302,410 2/1967 McLean ........................... 260/40 R
3,733,285 5/1973 Steffy .............................. 260/29.6 S

FOREIGN PATENT DOCUMENTS 953056 3/1964 United Kingdom .
998240 7/1965 United Kingdom .

*Primary Examiner*—J. Ziegler

[57] ABSTRACT

Hardenable resin compositions wherein the hardening rate is increased by the inclusion of two or more substances which react to produce heat before the resin gels. The reactable substances may comprise, for example, water and a water reactable substance or an acid/base system.

25 Claims, No Drawings

HARDENABLE RESIN COMPOSITIONS

This is a continuation of application Ser. No. 565,701 filed Apr. 7, 1975 now abandoned.

This invention relates to hardenable compositions of the kind suitable for stabilising rock formations and grouting reinforcing elements and fixing elements into drillholes in rock or other structures. More particularly, the invention provides a method of increasing the setting rate of such resins.

Hardened synthetic resins are widely used for strengthening rock and engineering structures and for securing reinforcing and fixing elements such as anchor bolts in drillholes in rock and masonry. The practice has been described, for example, in British Patent Specifications Nos. 953,056, 998,240 and 1,297,554.

The resin composition comprises essentially a hardenable liquid resin and a hardening catalyst, these components being stored separately until the resin is required to set hard. When the components are mixed the resin hardens by a process of cross-linking and/or polymerisation. The components may be mixed together before placing in position for hardening but it is more usual for the mixing to be effected in situ where the hardened resin is required. For this purpose the resin and catalyst components may be injected into position and mixed together but in an especially convenient method the components are packed in separate frangible containers or separate compartments of a two-compartment container and inserted into a drillhole. The containers are broken and the contents mixed by the movement imparted to the fixing element as the element is inserted into the drillhole. When the resin subsequently hardens, the fixing element is bonded to the sides of the drillhole.

Suitable hardenable liquid resins comprise, for example, substantially linear unsaturated polyesters, epoxides, phenolic resins, melamine resins or polyurethanes. The resin component generally contains an inert filler. The hardener comprises a polymerisation catalyst and the hardening component may also contain an inert filler. The resin composition may additionally contain in either component, modifying ingredients, for example, to inhibit or accelerate the setting process. The unsaturated polyester resins usually contain a copolymerisable cross-linking monomer such as styrene or vinyl toluene.

Benzoyl peroxide is the most convenient free-radical producing catalyst for polyester resin hardening systems as it is relatively cheap, readily available and stores well, but the hardening rates attainable with the normal resin systems using this catalyst mixed at room temperature are too slow for many applications. Ketone peroxide is also a useful catalyst for polyester resin which stores well but is also slow acting. In order to increase the hardening rate, resin systems have been modified to include high quantities of reaction accelerator (promoter) which reduce the storage life of the resin. Faster acting catalysts have also been used, for example, (for polyester resin) 2,4-dichlorobenzoyl peroxide, but such catalysts have poor storage properties and are expensive.

It is an object of this invention to provide a method of increasing the hardening rate of resin compositions for any given temperature of mixing the unset resin and hardening catalyst so that rapid hardening of the usual resin compositions can be attained without resort to additives or catalysts which impair the shelf life of the compositions.

It is known that the resin gelling and setting rate increases with increasing temperature, a rise of 10° C. generally doubling the rate (i.e. halving the gelling time). It is not generally convenient to heat either the components of the resin system or the mixed resin composition before mixing and the components are therefore generally mixed at ambient temperatures. The reactions between the catalyst and (if present) the accelerator or inhibitor generates only sufficient heat to raise the temperature of the system a few degrees before the resin gels and has little effect on the setting rate. It is only after the resin has gelled that the heat of polymerisation causes any substantial rise in temperature. We have now found that the gelling and setting rate of substances hardenable by polymerisation can be markedly increased by including in the hardening mixture system two reactable substances which react quickly to produce heat by a reaction independent of the resin hardening reaction.

Thus, from one aspect our invention consists in a method of increasing the gelling and setting rate of a polymerisation hardenable liquid resin composition in which method the resin is polymerised with the aid of a hardening catalyst in the presence of two or more additional substances which react together before gelation of the resin composition to produce heat whereby the temperature of the resin is increased. It will be understood that the term 'hardenable resin' in the present context includes liquid material polymerisable to hardened form and includes, for example, polymerisable monomer and linear cross-linkable polymers.

From another aspect the invention consists of a hardening resin composition comprising a hardenable resin, a hardening catalyst for said resin and two substances which react together to produce heat. The constituents of the resin composition may be stored separately and mixed together when setting of the resin is required. Conveniently however the resin composition is prepared as two components containing respectively the resin mixed with one of the aforesaid reactable substances and the hardening catalyst mixed with the other of the said reactable substances. Thus, the invention also includes a two-component hardenable resin composition having one component comprising a hardenable resin and substance A and a second component comprising substance B and hardening catalyst for the said resin, the said substances A and B being reactable to produce heat. For use with anchor bolts the components are conveniently packed in frangible flexible containers such as, for example, a dual-compartment container of thermoplastics film.

In one advantageous composition the heat producing reactants comprise water and a water reactable substance, for example an alkaline earth metal oxide such as calcium oxide, or a salt having a large exothermic heat of hydration, for example magnesium chloride. An acid and base may also constitute the heat producing reactants, for example an organic acid in the presence of an alkaline substance such as a metal oxide, hydroxide or silicate. A combination of the above two systems may also be used, for example the reaction of acid anhydride such as acetic anhydride with a base in the presence of water.

When alkaline earth metal oxides and hydroxides are employed these can cause thickening of many unsaturated polyester resins after several days storage. Thus it is preferable to store these ingredients separately from the polyester resin until the resin composition is required. This problem does not arise with the alternative heat generating systems mentioned.

The combined amount of the two heat producing substances in the composition is preferably in the range 5 to 30% by weight of the total composition.

The invention is applicable to any polymerisation hardenable resin and it is especially advantageous with resin systems comprising polyester resins. The preferred resin composition for rock stabilisation and anchoring fixing elements in rock comprises an unsaturated polyester condensation product of maleic and phthalic anhydride, propylene glycol and an unsaturated cross-linking substance, for example styrene or vinyl toluene monomer.

The preferred hardening catalyst is benzoyl peroxide although other storable persalts and peroxides, for example ketone peroxides, are also advantageous.

The resin composition may also optionally include an inhibitor, for example phenol or quinol or substitution derivatives thereof, to prevent premature gelling, and promoters, for example tertiary aromatic amine such as dimethylaniline or salts of cobalt manganese or vanadium, inert fillers, for example dolomite or quartz dust, fire retardants, thickening agents, surface active agents or other modifiers.

The application of the invention to increase the hardening rate of resins permits slow gelling and setting resin/catalyst systems to be employed at ordinary temperatures and also permits systems which are normally usable only at room temperature and above to be used conveniently at much lower temperatures.

The invention is further illustrated by the following Examples in which all parts and percentages are by weight.

Examples 1, 6, 8, 11 and 18 do not contain heat producing substances in accordance with the invention and are given for comparison.

EXAMPLES

The Examples contained the proportions of the ingredients given in Tables 1 and 2 and in the separate Example 20. The ingredients were prepared as two components, the resin component and the catalyst component, which were intimately mixed together at 20° C. The time after mixing for the compositions to gel and set are also given in the Tables.

The Leguval K27 (Registered Trade Mark) resin composition was a high activity general purpose unsaturated polyester type resin composition containing polyester polymerisation inhibitor and a tertiary aromatic amine promoter dissolved in styrene monomer as supplied commercially by Farbenfabriken Bayer AG.

Leguval N30 (Registered Trade Mark) was a non-accelerated general purpose polyester resin dissolved in styrene monomer as supplied by Farbenfabriken Bayer AG.

F8906 was a highly accelerated resin composition containing unsaturated polyester resin, polymerisation inhibitor and tertiary aromatic amine promoter dissolved in styrene monomer as supplied commercially by Synthetic Resins Limited.

The bentonite was Bentone 38 (Registered Trade Mark) supplied by Abbey Chemicals Limited.

The chlorinated paraffin was was 'Cerechlor' (Registered Trade Mark) wax supplied by Imperial Chemical Industries Limited.

The dolomite, quartz and china clay used as fillers were ground to a fine dust.

The sodium silicate was used in Examples 5, 10 and 20 to react with the hydrated magnesium chloride (formed from the hydration of anhydrous magnesium chloride with water) to form magnesium silicate and was thus effective to counteract the tendency of magnesium chloride to inhibit the transition of the resin from the gelled to the set condition. The silicate also aids the dispersion of the catalyst.

After mixing the mixtures remained thin until the indicated gel time at which they changed fairly sharply into stable gels which continued to become progressively harder during the curing process. The gel time is indicative of the rate of polymerisation and hardening and is of practical importance as the gelled resin composition does not require to be supported in position. Thus, a mine roof bolt in a resin containing drillhole only requires support by the bolt insertion tool until gelation occurs after which the tool can be removed and become available for further use.

The polymerisation reaction after gelling produces heat and the time at which the maximum temperature is reached within the setting resin mass indicates that the interior of the mass has fully polymerised. This time is taken as the time for complete setting although hardening continues for a long period thereafter. The times indicated in the Tables for the surface hardness to reach a Rockwell 'H' hardness of 30 was measured as described in British Standard 891-1940.

EXAMPLES 1–12

Resin compositions containing water and a water reactable substance

Table 1 shows that the gel and setting times of Examples 2 to 5 inclusive are much less than those of Example 1, the corresponding times of Example 7 are less than those of Example 6, the times of Examples 9 and 10 are less than those of Example 8 and the times of Example 12 are less than those of Example 11. Thus, the incorporation of water and a water reactable heat producing substance in the resin composition are seen to give a useful reduction in the gel and hardening time of the composition. The gel times for Examples 2 and 3 show that the gel times can be varied by variation of the amount of the heat producing substances used.

EXAMPLES 13–19

Resin compositions containing an acid-base heat generating system

Table 2 shows that the gel and setting times of Examples 13 to 17 containing basic substances and acetic acid were much lower than those of Example 1 indicating the beneficial effect of incorporating an acid-base reaction system into the composition. These Examples also show that the gel and setting times can be varied by variation of the kind and quantity of the reactants of the acid-base reaction system.

Examples 18 and 19 illustrate the use of an acid-base reaction system to convert the non-setting resin system of Example 18 into the useful setting resin of Example 19.

TABLE 1

Heat generated from water reactable substance

| Composition (Parts) | Example No. 1 | 2 | 3 | 4 | 5 | 6 | 7 | 8 | 9 | 10 | 11 | 12 |
|---|---|---|---|---|---|---|---|---|---|---|---|---|
| Resin Component | | | | | | | | | | | | |
| Leguval K27 | 100 | 100 | 100 | 100 | 100 | 100 | 100 | — | — | — | — | — |
| F8906 | — | — | — | — | — | — | — | 100 | 100 | 100 | 100 | 100 |
| Calcium oxide | — | 15 | 35 | — | — | — | 35 | — | 35 | — | — | 35 |
| Calcium hydroxide | — | — | — | 30 | — | — | — | — | — | — | — | — |
| Anhydrous magnesium chloride | — | — | — | — | 20 | — | — | — | — | 20 | — | — |
| Sodium silicate powder | — | — | — | — | 20 | — | — | — | — | 20 | — | — |
| Dolomite | 190 | 150 | 150 | — | — | 190 | 150 | 190 | 150 | — | 190 | 150 |
| Quartz | — | — | — | 100 | 100 | — | — | — | — | 100 | — | — |
| Chlorinated paraffin wax | 6 | 6 | 6 | — | — | 6 | 6 | 6 | 6 | — | 6 | 6 |
| Bentonite | 3 | 3 | 3 | — | — | 3 | 3 | 3 | 3 | — | 3 | 3 |
| Water | — | — | — | 18 | — | — | — | — | — | — | — | — |
| Catalyst Component | | | | | | | | | | | | |
| Benzoyl peroxide | 4 | 4 | 4 | 4 | 4 | — | — | 4 | 4 | 4 | — | — |
| 2,4-dichlorobenzoyl peroxide | — | — | — | — | — | 4 | 4 | — | — | — | 4 | 4 |
| Dicyclohexyl phthalate (diluent) | — | — | — | — | 4 | — | — | — | — | 4 | — | — |
| China clay | 5 | 6 | 15 | 20 | — | 5 | 15 | 5 | 15 | — | 5 | 15 |
| Dolomite | 2 | 6 | 9 | — | — | 2 | 9 | 2 | 9 | — | 2 | 9 |
| Quartz | — | — | — | — | 5 | — | — | — | — | 5 | — | — |
| Chlorinated paraffin wax | 5.6 | 2.6 | 2.6 | — | — | 5.6 | 2.6 | 5.6 | 2.6 | — | 5.6 | 2.6 |
| Water | — | 6 | 15 | — | 6 | — | 15 | — | 15 | 6 | — | 15 |
| Acetic anhydride | — | — | — | 20 | — | — | — | — | — | — | — | — |
| Gel Time (seconds) | 300 | 150 | 110 | 25 | 75 | 45 | 18 | 75 | 23 | 22 | 25 | 17 |
| Setting Time (seconds) (Time to reach maximum temperature) | 780 | 270 | 250 | 160 | 190 | 410 | 160 | 130 | 72 | 75 | 110 | 70 |
| Maximum temperature °C. | 93 | 143 | 155 | 150 | 128 | 89 | 151 | 98 | 167 | 129 | 94 | 161 |
| Time of surface hardening to 'Rockwell H30' (minutes) | 90 | 35 | 35 | 35 | 35 | 45 | 35 | — | — | — | — | — |

TABLE 2

Heat generated by Acid-base reaction

| Composition (Parts) | Example No. 13 | 14 | 15 | 16 | 17 | 18 | 19 |
|---|---|---|---|---|---|---|---|
| Resin Component | | | | | | | |
| Leguval K27 | 100 | 100 | 100 | 100 | 100 | — | — |
| Leguval N30 | — | — | — | — | — | 100 | 100 |
| Calcium oxide | 35 | — | — | — | — | — | 35 |
| Calcium hydroxide | — | 35 | — | — | — | — | — |
| Barium oxide | — | — | 45 | — | — | — | — |
| Magnesium oxide | — | — | — | 30 | — | — | — |
| Sodium silicate | — | — | — | — | 40 | — | — |
| Quartz dust | 100 | 100 | 100 | 100 | 100 | 100 | 100 |
| Catalyst Component | | | | | | | |
| Benzoyl peroxide | 4 | 4 | 4 | 4 | 4 | 4 | 4 |
| Dicyclohexyl phthalate (diluent) | — | — | — | — | 4 | — | — |
| Chlorinated paraffin wax | 2.6 | 2.6 | 2.6 | 2.6 | — | 2.6 | 2.6 |
| China clay | 20 | 15 | 15 | 25 | — | 5 | 15 |
| Quartz | — | — | — | — | 15 | — | — |
| Acetic acid | 20 | 12 | 12 | 15 | 5 | — | 15 |
| Water | — | — | — | — | 5 | — | — |
| Gel Time (seconds) | 15 | 20 | 45 | 60 | 160 | 1 day | 55 |
| Setting Time (seconds) (Time to reach maximum temperature) | 80 | 95 | 150 | 120 | 310 | Non-setting at room temperature | 240 |
| Maximum temperature °C. | 163 | 152 | 135 | 154 | 115 | — | 159 |

EXAMPLE 20

| Component A - Resin Composition | Parts |
|---|---|
| F8906 | 100 |
| Quartz | 100 |
| Anhydrous magnesium chloride | 20 |
| Sodium silicate | 20 |

| Component B - Catalyst Composition | Parts |
|---|---|
| Benzoyl peroxide | 1 |
| Dicyclohexyl phthalate | 4 |
| Quartz | 5 |
| Water | 6 |
| Lissapol N | 0.2 |

The catalyst component B was contained at a loading of 50 g/meter length in an inner container made from polyethylene terephthalate seamless tubular film of 33 mm flat width and 0.025 mm wall thickness. The inner container was located completely within an outer container made from polyethylene terephthalate seamless tubular film of 38 mm flat width and 0.025 mm wall thickness cut to a length of 33 cm. The outer container was filled with 200 g of the resin composition (Component A) and the tube ends were closed with compressed metal bands.

Lissapol N (Registered Trade Mark) is a non-ionic surface active agent commercially available from Imperial Chemical Industries Limited. It was used in this Example to facilitate mixing of the resin and catalyst compositions.

A capsule containing Components A and B was loaded into a 28 mm borehole and broken by the rotational insertion of an anchor bolt whereby the components were mixed. The mixed resin gelled in 26 seconds at 20° C. and the bolt was firmly anchored in the borehole after 75 seconds.

What is claimed is:

1. A method of increasing the gelling and setting rate of a polymerisation hardenable liquid resin composition comprising polymerising the resin with the aid of a hardening catalyst in the presence of two or more additional substances which are reacted together in admixture with the resin composition to produce sufficient heat to increase the rate of hardening, said additional substances constituting 5% to 30% by weight of the total composition.

2. A method as claimed in claim 1 wherein the additional substances comprise water and a water-reactable substance.

3. A method as claimed in claim 2 wherein the water-reactable substance is selected from the group consisting of alkaline earth metal oxides and salts having a large exothermic heat of hydration.

4. A method as claimed in claim 3 wherein the water-reactable substance is selected from the group consisting of calcium oxide and magnesium chloride.

5. A method as claimed in claim 1 wherein the additional substances comprise an acid and a base.

6. A method as claimed in claim 5 wherein the additional substances comprise an organic acid and a base selected from the group consisting of the oxides, hydroxides and silicates of the alkali and alkaline earth metals.

7. A method as claimed in claim 1 wherein the additional substances comprise an acid anhydride, a base and water.

8. A method as claimed in claim 1 wherein the polymerisation hardenable resin comprises polyester resin.

9. A method as in claim 1 wherein the resin is polymerised in the presence of a promoter selected from the group consisting of tertiary aromatic amines and salts of cobalt, manganese or vanadium.

10. A method as in claim 1 wherein said additional substances are selected from the group consisting of water and a water-reactive substance, an acid and a base, and an acid anhydride, water and a base.

11. A method as in claim 10 wherein the resin is polymerized in the presence of a promoter selected from the group consisting of tertiary aromatic amines and salts of cobalt, manganese or vanadium.

12. A hardening resin composition comprising a hardenable resin, a hardening catalyst for said resin and at least two additional substances which react together to produce sufficient heat to increase the rate of hardening, said additional substances constituting 5% to 30% by weight of the total composition, said resin being kept apart from said catalyst and said two additional substances being kept apart from each other until they are mixed together with said resin and said catalyst when the resin is required to harden, whereupon the heat produced by the reaction of said additional substances heats the hardening resin and increases the rate of hardening.

13. A hardening resin composition as claimed in claim 12 comprising two components packed in frangible containers, one component containing the resin and one of the said reactable substances and the second component containing the hardening catalyst and the other of the said reactable substances.

14. A hardening resin composition as claimed in claim 13 wherein the components are packed in the separate compartments of a dual-compartment container of thermoplastics film.

15. A hardening resin composition as claimed in claim 12 wherein the heat producing reactants comprise water and a water-reactable substance.

16. A hardening resin composition as claimed in claim 15 wherein the water-reactable substance is selected from the group consisting of alkaline earth metal oxides and salts having a large exothermic heat of hydration.

17. A hardening resin composition as claimed in claim 16 wherein the water-reactable substance is selected from the group consisting of calcium oxide and magnesium chloride.

18. A hardening resin composition as claimed in claim 12 wherein the heat producing reactants comprise an acid and a base.

19. A hardening resin composition as claimed in claim 18 wherein the heat producing reactants comprise an organic acid and a base selected from the group consisting of the oxides, hydroxides and silicates of the alkali and alkaline earth metals.

20. A hardening resin composition as claimed in claim 12 wherein the heat producing reactants comprise an acid anhydride, a base and water.

21. A hardening resin composition as claimed in claim 12 wherein the hardenable resin comprises a polyester resin.

22. A hardening resin composition as claimed in claim 12 wherein the hardening catalyst comprises benzoyl peroxide or a ketone peroxide.

23. A hardening resin composition as in claim 12 wherein the resin is polymerized in the presence of a promoter selected from the group consisting of tertiary aromatic amines and salts of cobalt, manganese or vanadium.

24. A hardening resin composition as in claim 12 wherein said additional substances are selected from the group consisting of water and a water-reactive substance, an acid and a base, and an acid anhydride, water and a base.

25. A hardening resin composition as in claim 24 wherein the resin is polymerized in the presence of a promoter selected from the group consisting of tertiary aromatic amines and salts of cobalt, manganese or vanadium.

* * * * *